United States Patent
Elsner et al.

(10) Patent No.: US 9,080,478 B2
(45) Date of Patent: Jul. 14, 2015

(54) OIL SEPARATOR

(71) Applicant: Ford Global Technologies, LLC, Dearborn, MI (US)

(72) Inventors: Tom Elsner, Dearborn, MI (US); David Alan Beaton, Ipswich (GB)

(73) Assignee: Ford Global Technologies, LLC, Dearborn, MI (US)

( * ) Notice: Subject to any disclaimer, the term of this patent is extended or adjusted under 35 U.S.C. 154(b) by 209 days.

(21) Appl. No.: 13/746,217

(22) Filed: Jan. 21, 2013

(65) Prior Publication Data

US 2014/0202439 A1    Jul. 24, 2014

(51) Int. Cl.
  *F02B 25/06*    (2006.01)
  *F01M 13/04*    (2006.01)
  *B01D 46/00*    (2006.01)

(52) U.S. Cl.
  CPC ............ *F01M 13/04* (2013.01); *B01D 46/0031* (2013.01); *F01M 13/0405* (2013.01); *F01M 13/0416* (2013.01); *F01M 2013/0488* (2013.01)

(58) Field of Classification Search
  CPC .................. F01M 13/0416; F01M 2013/0488; F01M 13/0405; B01D 46/0031
  USPC ....................... 123/572–574, 41.86
  See application file for complete search history.

(56) References Cited

U.S. PATENT DOCUMENTS

| | | | |
|---|---|---|---|
| 2,642,052 A * | 6/1953 | Wagner et al. ............. | 123/573 |
| 5,562,087 A | 10/1996 | Wright | |
| 6,089,213 A * | 7/2000 | Laudien et al. ............. | 123/572 |
| 6,520,164 B1 * | 2/2003 | Lepp et al. ................. | 123/572 |
| 6,626,163 B1 | 9/2003 | Busen et al. | |
| 7,137,372 B2 | 11/2006 | Hilpert et al. | |
| 7,387,113 B2 * | 6/2008 | Collins ....................... | 123/572 |
| 7,631,639 B2 * | 12/2009 | Yonebayashi et al. ..... | 123/572 |
| 8,015,966 B2 * | 9/2011 | Fontaine et al. ........... | 123/572 |
| 8,511,291 B2 * | 8/2013 | Hirano et al. ............... | 123/572 |
| 8,794,221 B2 * | 8/2014 | Kobayashi et al. .......... | 123/572 |
| 2005/0011188 A1 * | 1/2005 | Silva et al. .................. | 60/405 |
| 2007/0215128 A1 * | 9/2007 | Yonebayashi et al. ..... | 123/572 |
| 2008/0011264 A1 * | 1/2008 | Kawamura et al. ........ | 123/196 R |
| 2008/0196364 A1 * | 8/2008 | Brand et al. ................. | 55/290 |
| 2010/0126441 A1 * | 5/2010 | Hornung .................... | 123/41.86 |

* cited by examiner

*Primary Examiner* — Marguerite McMahon
*Assistant Examiner* — James Kim
(74) *Attorney, Agent, or Firm* — Greg Brown; Alleman Hall McCoy Russell & Tuttle LLP

(57) ABSTRACT

Embodiments may provide an oil separator that may include a reservoir attached to a bottom of the oil separator to collect oil that passes from the oil separator. An outlet may be located on the reservoir and may be positioned to allow oil at or above the outlet to overflow from the reservoir and to flow, or drip, toward an engine cylinder head. The oil separator may also include a tube located at least partially inside the reservoir formed within the bottom to pass the oil into the reservoir.

20 Claims, 3 Drawing Sheets

OIL SEPARATOR

FIELD

The present application relates to an oil separator for an engine.

BACKGROUND AND SUMMARY

When an air-fuel mixture is combusted in an engine combustion chamber, some of the combusted gas may enter the engine crankcase via a small clearance between the cylinder walls and the piston rings. This gas may be referred to as blow-by gas. To prevent this untreated gas from being directly vented into the atmosphere, a crankcase ventilation system may be provided between the higher pressure crankcase and the lower pressure intake manifold to allow the blow-by gas to flow from the crankcase into the intake manifold and be mixed with fresh air. From here, the gas may be re-inducted into the combustion chamber for re-combustion.

Engine lubrication oil typically present in the crankcase during normal engine operation may become suspended and mix with the blow-by gas. However, combustion of the oil with the re-circulated blow-by gas may cause the net oil consumption of the engine to increase, and may degrade engine emission quality. To address these issues, oil separators have been developed to separate the oil content from the blow-by gas containing the oil mist. Oil separators may include various surfaces such as baffles and the like against which the oil and blow-by gas mixture may be impinged in order to cause the oil to drop out of the mixture. After separation, the oil is returned to the engine lubricating system while the blow-by gas is directed to the engine intake system as described.

Various oil separator designs may be used. One example design is disclosed in U.S. Pat. No. 5,562,087. The patent discloses an oil separator for blow-by gas with a nozzle that has a plurality of holes located in the air flow path of the blow-by gases disposed within a separate housing. The bottom of the housing includes a frustro-conical shaped recess for receiving oil that is separated from the blow-by gases. An oil drain fitting is disposed at a basin of the recess so that the oil received in the recess can be circulated back to the oil reservoir of the engine by connecting a tube or the like to the fitting.

The inventors herein have recognized several issues with this approach. One example issue is that this approach uses a separate housing for the specially designed nozzle. Another is that that this approach also uses an oil drain fitting and a connecting tube to re-circulate the separated oil back to the engine. What is needed is a simpler more cost efficient design that uses fewer parts and is easier to manufacture.

Embodiments in accordance with the present disclosure may provide an oil separator that may include a reservoir attached to a bottom of the oil separator to collect oil that passes from the oil separator. An outlet may be located on the reservoir and may be positioned to allow oil at or above the outlet to overflow from the reservoir and to flow, or drip, toward an engine cylinder head. The oil separator may also include a tube located at least partially inside the reservoir formed within the bottom to pass the oil into the reservoir.

Various example embodiments may include an engine crankcase ventilation system. The engine crankcase ventilation system may include a crankcase ventilation line configured to pass a mixture of oil and blow-by gas from the engine crankcase to an oil separation chamber. The oil separation chamber may be located above a cylinder head. The oil separation chamber may have a bottom. There may be a hole be in the bottom. A tube may protrude downwardly from the bottom and may have a first end surrounding the hole. The tube may also have a second end below the first end. A reservoir may be attached to the bottom and may surround the second end of the tube. An outlet may be included in the reservoir. The outlet may be located above the second end of the tube and may provide fluidic access from the reservoir to the cylinder head. In some example embodiments the bottom of the oil separation chamber and the tube may be made integrally. The reservoir may be made separately and may be attached to the bottom of the oil separation chamber.

In this way, an oil separator may be provided that may be easier to package and less expensive. Also in this way, a simplified anti-backflow valve may be constructed from the tube with one end submerged in the oil reservoir.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3-4 are drawn to scale, although other relative dimensions may be used, if desired.

DETAILED DESCRIPTION

Figure 1:
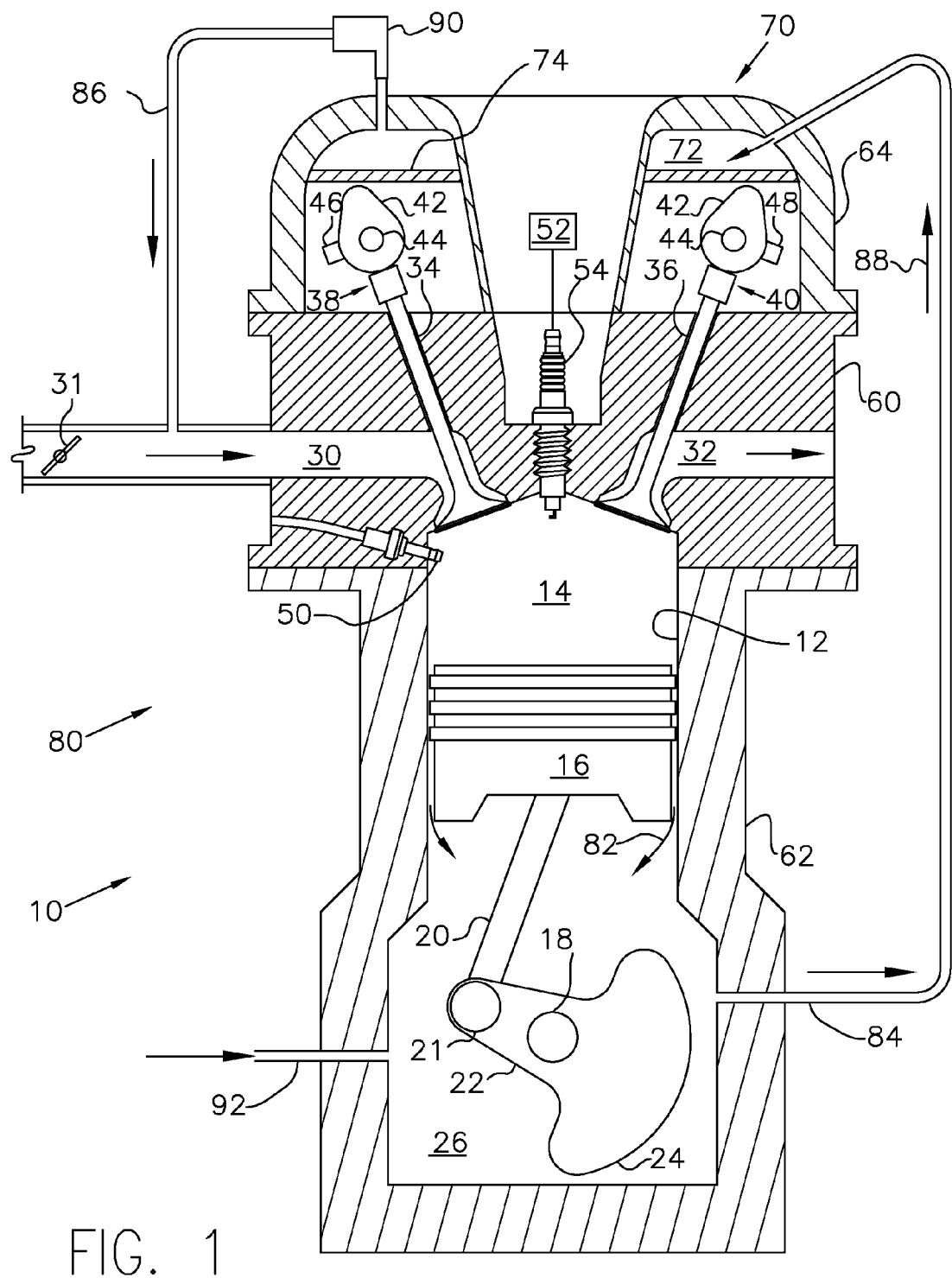
FIG. 1 is a cross-sectional diagram of an example engine in accordance with the present disclosure.
Figure 2:
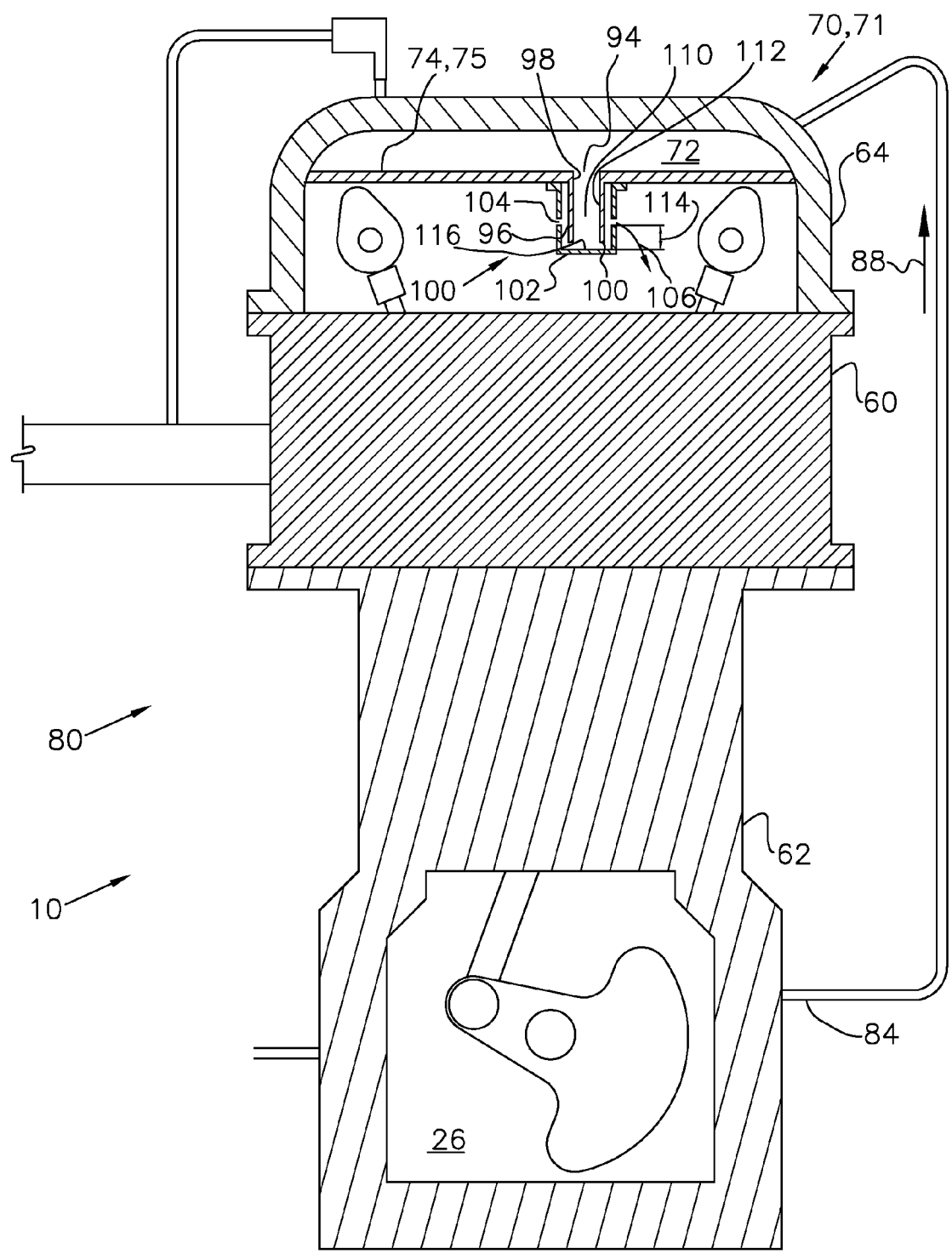
FIG. 2 is another cross-sectional diagram of the example engine shown in FIG. 1 taken at a different location of the engine.

FIG. 1 and FIG. 2 are cross-sectional diagrams illustrating cross-sections of an engine 10 taken at two different locations of an example engine 10 in accordance with the present disclosure. Various features of the engine may be omitted, or illustrated in a simplified fashion for ease of understanding of the current description. For example, areas may include continuous cross hatching that may otherwise indicate a solid body, however actual embodiments may include various engine components, and/or hollow, or empty, portions of the engine with the cross hatched areas. In addition some features illustrated in either, or both of FIG. 1 and FIG. 2 may instead be located at different locations on the engine, or may in some examples be coincident with the cross-sectional plane illustrated FIG. 1 but illustrated here in FIG. 2. Some features may be illustrated here in one plane, but may instead begin at one plane and end in another. Some components have not been cross-hatched and may be considered as side views of the particular elements.

FIG. 1 is a cross-sectional view through one cylinder 12 of the engine 10, while FIG. 2 may be a cross-sectional view alongside, or between two cylinders 12. Various components of the engine 10 may be controlled at least partially by a control system that may include a controller (not shown), and by input from a vehicle operator via an input device such as an accelerator pedal (not shown). The cylinder 12 may include a combustion chamber 14. A piston 16 may be positioned within the cylinder 12 for reciprocating movement therein. The piston 16 may be coupled to a crankshaft 18 via a connecting rod 20, a crank pin 21, and a crank throw 22 shown here combined with a counterweight 24. Some examples may include a discrete crank throw 22 and counterweight 24. The reciprocating motion of the piston 16 may be translated into rotational motion of the crankshaft 18. The crankshaft 18, connecting rod 20, crank pin 21, crank throw 22, and counterweight 24, and possibly other elements not illustrated may be housed in a crankcase 26. The crankcase 26 may hold oil. Crankshaft 18 may be coupled to at least one drive wheel of a vehicle via an intermediate transmission system. Further, a starter motor may be coupled to crankshaft 18 via a flywheel to enable a starting operation of engine 10.

Combustion chamber 14 may receive intake air from an intake manifold 30. Or intake passage, and may exhaust combustion gases via exhaust passage 32. Intake manifold 30 and exhaust passage 32 may selectively communicate with combustion chamber 14 via respective intake valve 34 and exhaust valve 36. A throttle 31 may be included to control an amount of air that may pass through the intake manifold 30. In some embodiments, combustion chamber 14 may include two or more intake valves and/or two or more exhaust valves.

In this example, intake valve 34 and exhaust valve 36 may be controlled by cam actuation via respective cam actuation systems 38 and 40. Cam actuation systems 38 and 40 may each include one or more cams 42 and may utilize one or more of cam profile switching (CPS), variable cam timing (VCT), variable valve timing (VVT) and/or variable valve lift (VVL) systems that may be operated by the controller to vary valve operation. The cams 42 may be configured to rotate on respective revolving camshafts 44. As depicted, the camshafts 44 may be in a double overhead camshaft (DOHC) configuration, although alternate configurations may also be possible. The position of intake valve 34 and exhaust valve 36 may be determined by position sensors 46 and 48, respectively. In alternative embodiments, intake valve 34 and/or exhaust valve 36 may be controlled by electric valve actuation. For example, cylinder 12 may include an intake valve controlled via electric valve actuation and an exhaust valve controlled via cam actuation including CPS and/or VCT systems.

In one embodiment, twin independent VCT may be used on each bank of a V-engine. For example, in one bank of the V, the cylinder may have an independently adjustable intake cam and exhaust cam, where the cam timing of each of the intake and exhaust cams may be independently adjusted relative to crankshaft timing.

Fuel injector 50 is shown coupled directly to combustion chamber 14 for injecting fuel directly therein in proportion to a pulse width of a signal that may be received from the controller. In this manner, fuel injector 50 provides what is known as direct injection of fuel into combustion chamber 14. The fuel injector 50 may be mounted in the side of the combustion chamber 14 or in the top of the combustion chamber 14, for example. Fuel may be delivered to fuel injector 50 by a fuel system (not shown) including a fuel tank, a fuel pump, and a fuel rail. In some embodiments, combustion chamber 14 may alternatively or additionally include a fuel injector arranged in intake passage 30 in a configuration that provides what is known as port injection of fuel into the intake port upstream of combustion chamber 14.

Ignition system 52 may provide an ignition spark to combustion chamber 14 via spark plug 54 in response to a spark advance signal from the controller, under select operating modes. Though spark ignition components are shown, in some embodiments, combustion chamber 14 or one or more other combustion chambers of engine 10 may be operated in a compression ignition mode, with or without an ignition spark.

Cylinder head 60 may be coupled to a cylinder block 62. The cylinder head 60 may be configured to operatively house, and/or support, the intake valve(s) 34, the exhaust valve(s) 36, the associated valve actuation systems 38 and 40, and the like. Cylinder head 60 may also support camshafts 44. A cam cover 64 may be coupled with and/or mounted on the cylinder head 60 and may house the associated valve actuation systems 38 and 40, and the like. Other components, such as spark plug 54 may also be housed and/or supported by the cylinder head 60. A cylinder block 62, or engine block, may be configured to house the piston 16. In one example, cylinder head 60 may correspond to a cylinder 12 located at a first end of the engine. While FIG. 1 shows only one cylinder 12 of a multi-cylinder engine 10, each cylinder 12 may similarly include its own set of intake/exhaust valves, fuel injector, spark plug, etc.

FIG. 1 also illustrates an oil separator 70. The oil separator 70 may include an oil separation chamber 72 and bottom plate 74, which may define a bottom 74 of the oil separation chamber 72. The oil separator 70 may be included in the cam cover 64 as illustrated, or may be located in another location within, or associated with, the engine 10. The bottom plate 74, and/or the oil separation chamber 72 may be mounted on, or in and/or supported by cylinder head 64. The oil separator 70 may extend lengthwise along a portion of the length of the engine bank, that is, in a direction substantially parallel with the axes of the camshafts 44. Oil separator 70 may be considered to include the cam cover 64. One or more baffles (not shown) may be included with the oil separator 70.

Oil separator 70 may be included as part of an engine crankcase ventilation system 80. The engine crankcase ventilation system 80 may be included with the engine to mitigate an amount of undesirable exhaust gases that may be emitted from the engine 10. During operation some blow-by gasses 82, as illustrated in FIG. 1 with arrows may pass from the combustion chamber 14 to the crankcase 26. Some of the blow-by gasses 82 may be incompletely combusted, and may be reintroduced into the combustion chamber 14 via a first crankcase ventilation line 84, a second crankcase ventilation line 86, and the intake passage 30 in an attempt to combust them more completely. However, the blow-by gasses 82 may include suspended oil picked up in the stream of gasses from one or more locations within the engine such as the crankcase 26. In an attempt to separate the suspended oil from the blow-by gasses 82 the mixture of oil and blow-by gasses 88, as illustrated with an arrow may be first passed through the oil separator 70.

A flow level of the crankcase ventilation gases through the engine crankcase ventilation system 80 may be controlled by one or more mechanism which may include a valve 90. In some cases the valve 90 may be referred to as a Positive Crankcase Ventilation (PCV) valve. Further, in some cases the engine crankcase ventilation system 80 may be referred to as a positive crankcase ventilation system. In some cases a breather tube 92, or the like, may be included to add clean air into the crankcase 26 in order to purge, or reduce the concentration of undesirable crankcase gases. In some cases the breather tube 92 may be fluidically coupled with the intake manifold, and/or intake passage 30 as a source of clean air.

As mention FIG. 2 is a cross-sectional diagram illustrating a cross-section of the engine 10 taken at a different location of the example engine 10 than the cross-section illustrated in FIG. 1. Various other elements in accordance with the present disclosure are illustrated therein. Some elements that may be visible in both cross-sections are shown in both views but the fluidic connectivity may be illustrated differently.

Various embodiments may include an engine crankcase ventilation system 80. The engine crankcase ventilation system 80 may include a crankcase ventilation line 84 configured to pass a mixture of oil and blow-by gas 88 from the engine crankcase 26 to an oil separation chamber 72. The oil separation chamber 72 may be located above the cylinder head 60. The oil separation chamber 72 may have a bottom 74. There may be a hole 94 in the bottom 74. A tube 96 may protrude downwardly from the bottom 74 and may have a first end 98 surrounding the hole 94. The tube 96 may also have a second end 100 below the first end 98. A reservoir 102 may be attached to the bottom 74 and may surround the second end 100 of the tube 96. An outlet 104 may be included in the reservoir 102. The outlet 104 may be located above the second end 100 of the tube and may provide fluidic access from the reservoir 102 to the cylinder head 60. In this way oil that may be separated from the mixture of oil and blow-by gasses 88 may leave the reservoir 102 and move toward the cylinder head 60 as illustrated with arrow 106. In this way the separated oil may then be reused to lubricate various engine components.

The outlet 104 may be positioned to allow oil to collect in the reservoir 102 to a level deep enough to prevent gasses below a predetermined pressure from passing from the cylinder head 60 to the oil separation chamber 72 via the outlet 104 and the tube 96.

In various example embodiments at least the bottom 74 of the oil separation chamber 72 and the tube 96 may be made as an integral piece. The reservoir 102 may be made as a separate piece. In some example embodiments the reservoir 102 may be made from a plastic material. In this way the oil separator may be easily manufactured. In this way a relatively simple and/or inexpensive mechanism to reintroduce oil separated from the mixture of oil and blow-by gas 88 may be provided which may also function as an anti-backflow valve.

Various embodiments may provide an oil separator 70 that may include a reservoir 102 attached to a bottom 74 of the oil separator 70 to collect oil that passes from the oil separator 70. An outlet 104 may be located on the reservoir 102 and may be positioned to allow oil at or above the outlet 104 to overflow from the reservoir 102 and to flow, or drip, toward an engine cylinder head 60. The oil separator 70 may also include a tube 96 located at least partially inside the reservoir 102 formed within the bottom 74 to pass the oil into the reservoir 102.

The tube 96 may be a hollow cylinder, and the reservoir 102 may be a second hollow cylinder substantially concentric with the tube 96. In some examples the outlet 104 may be at least one slotted hole in the second hollow cylinder. In some examples the reservoir 102 may be substantially cylindrical, and the outlet 104 may be two slotted holes on diametrically opposite sides of the reservoir 102.

In some cases the tube 96 and the bottom of the oil separator 70 may be made from a first material and the reservoir 102 may be made from a second material. For example the tube and the bottom may be for example a cast aluminum part and the reservoir may comprises a plastic material. The reservoir may be fully made from a plastic material.

In some cases the oil separator 70 may include a bottom plate 74 supported within the cam cover 64. The cam cover 64 may define a top of the oil separator 70. The cam cover 64 may be coupled with and supported by the cylinder head 60. In some cases the oil separator 70 may be supported by, or coupled with other engine components, for example the cylinder head 60.

The reservoir 102 may be shaped, and or sized, and/or oriented to fill with a volume of oil during operation. The outlet 104 may be positioned to effect collection of the volume of oil which may tends to inhibit backflow into the reservoir 102 via the outlet 104. For example the volume of oil may have a depth above a predetermined amount to withstand a back pressure from outside of the reservoir 102 and to inhibit a backflow of gases in a reverse direction.

Various embodiments may provide an oil separator arrangement 71 that may include a hole 94 in a bottom plate 75 of an oil separation chamber 72. A passage 110 may be defined by a perimeter wall 112 having a first end 98 fixed to the bottom plate 75 and surrounding the hole 94. The perimeter wall 112 may also have a second end 100. The oil separator arrangement 71 may also include a reservoir 102 for holding a volume of oil at least partially collected from oil which passes through the passage 110. The reservoir 102 may have an outlet 104 located a distance 114 above a bottom 116 of the reservoir 102. The second end 100 of the perimeter wall 112 may be located between the outlet 104 and the bottom 116 of the reservoir 102. The perimeter wall 112 and the bottom plate 75 may be made integrally with one another.

Figure 3:
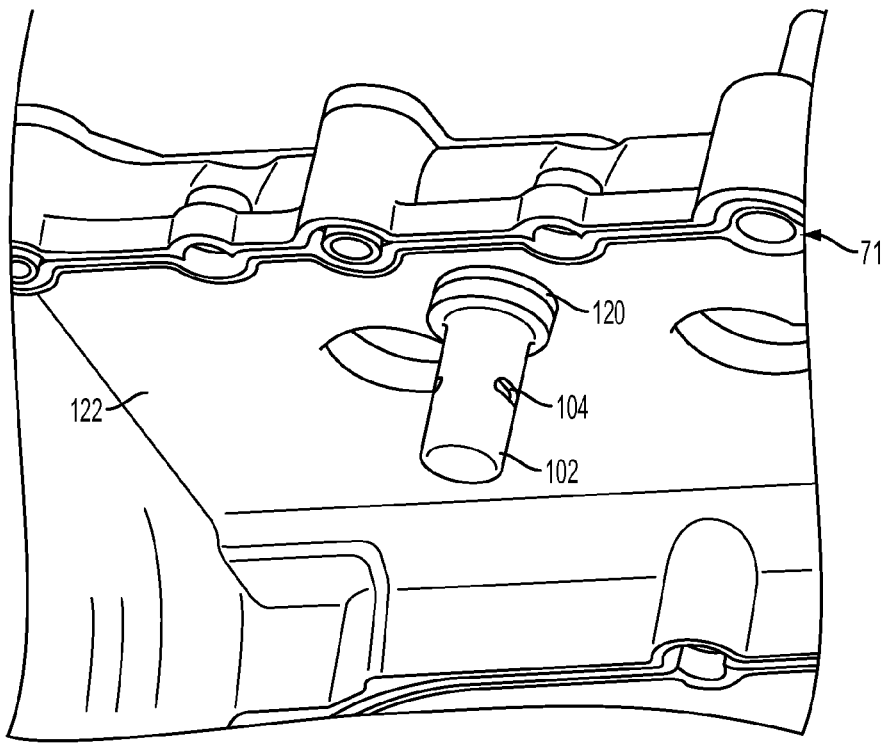
FIG. 3 is a partial bottom perspective view of another example oil separator arrangement in accordance with the present disclosure.
Figure 4:
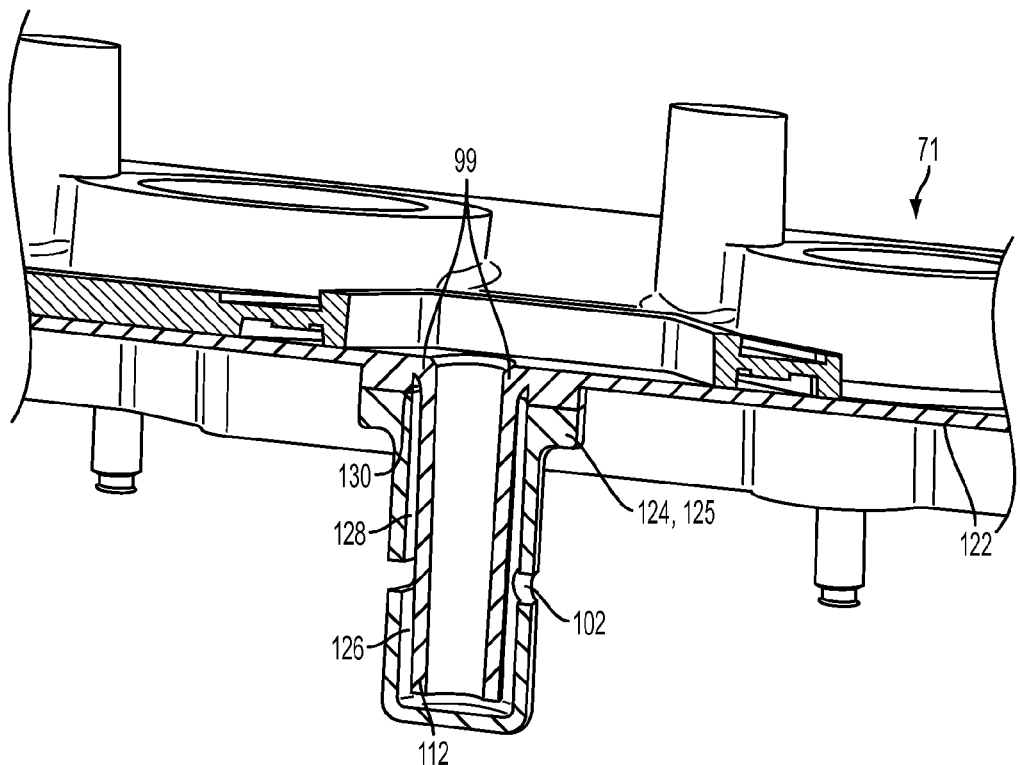
FIG. 4 is a partial cross-sectional view of the oil separator arrangement shown in FIG. 3.

FIG. 3 is a bottom perspective view, and FIG. 4 is a cross-sectional view of another example oil separator arrangement 71 in accordance with the present disclosure. The oil separator arrangement 71 may include an annular flange 120 on a bottom surface 122 of a bottom plate 75 disposed around a perimeter wall 112. The reservoir 102 may have a top end 124 fixed to the annular flange 120. The top end 124 may include an annular flange 125 for coupling with the annular flange 120 on the bottom surface 122.

In some examples there may be an annular space 126 between the perimeter wall 112 and the reservoir 102. In some cases the annular space 126 may include a volume 128 above the outlet 104. Some examples may include an annular space 130 radial outside a portion of a top end 99 of the perimeter wall 112 and concentric with the annular flange 120.

It should be understood that the systems and methods described herein are exemplary in nature, and that these specific embodiments or examples are not to be considered in a limiting sense, because numerous variations are contemplated. Accordingly, the present disclosure includes all novel and non-obvious combinations of the various systems and methods disclosed herein, as well as any and all equivalents thereof. While some example embodiments relate to an oil separator for an internal combustion engine including a bottom plate with a tube extending downwardly from and fluidically coupled with a hole in the plate, where a reservoir may be fixed to the plate to collect a volume of oil and to pass oil to the engine and to withstand backflow, other combinations and modifications are possible. For example, various types of tubes may be used in various cross-sectional geometries, including circular, square, rectangular, etc.

The invention claimed is:

1. An oil separator, comprising:
a reservoir positioned between two camshafts and attached to a bottom of the oil separator to collect oil that passes from the oil separator, an outlet on the reservoir positioned below a top of the camshafts and having fluidic access to a cylinder head to allow oil at or above the outlet to overflow from the reservoir and to flow, or drip, toward an engine cylinder head; and
a tube located at least partially inside the reservoir formed within the bottom of the oil separator to pass the oil into the reservoir, the oil separator extending in a direction substantially parallel to the camshafts.

2. The oil separator of claim 1, wherein the tube is a hollow cylinder.

3. The oil separator of claim 2, wherein the reservoir is a second hollow cylinder substantially concentric with the tube, and wherein the outlet is at least one slotted hole in the second hollow cylinder.

4. The oil separator of claim 1, wherein the reservoir is substantially cylindrical, and wherein the outlet is two slotted holes on diametrically opposite sides of the reservoir.

5. The oil separator of claim 1, wherein the tube and the bottom of the oil separator are made from a first material and the reservoir is made from a second material.

6. The oil separator of claim 5, wherein the reservoir comprises a plastic material.

7. The oil separator of claim 1, wherein the oil separator includes a bottom plate supported within a cam cover, and wherein the cam cover defines a top of the oil separator, the cam cover coupled with and supported by the cylinder head.

8. The oil separator of claim 1, wherein the reservoir is shaped to fill with a volume of oil during operation and wherein the outlet is positioned to affect collection of a volume of oil which tends to inhibit backflow into the reservoir via the outlet.

9. An oil separator arrangement comprising:
 a hole in a bottom plate of an oil separation chamber; and
 a passage defined by a perimeter wall having a first end fixed to the bottom plate and mounted to the hole, the perimeter wall having a second end;
 a reservoir positioned between two camshafts and extending below a top of the camshafts for holding a volume of oil at least partially collected from oil which passes through the passage, the reservoir having an outlet having fluidic access to a cylinder head and located a distance above a bottom of the reservoir; and
 the second end of the perimeter wall located between the outlet and the bottom of the reservoir.

10. The oil separator arrangement of claim 9, wherein the perimeter wall and the bottom plate are made integrally with one another.

11. The oil separator arrangement of claim 9, further comprising an annular flange on a bottom surface of the bottom plate disposed around the perimeter wall, the reservoir having a top end fixed to the annular flange, an annular space between the perimeter wall and the reservoir.

12. The oil separator arrangement of claim 11, wherein the annular space includes a volume above the outlet.

13. The oil separator arrangement of claim 11, wherein the perimeter wall of the bottom plate and the annular flange are integrally made, wherein the perimeter wall is a hollow cylinder, and further comprising an annular space radially outside a portion of a top end of the perimeter wall and concentric with the annular flange.

14. The oil separator arrangement of claim 9, wherein the volume of oil has a depth above a predetermined amount to withstand a back pressure from outside of the reservoir and to inhibit a backflow of gases in a reverse direction.

15. The oil separator arrangement of claim 9, wherein the perimeter wall is an inner cylinder and the reservoir includes an outer cylinder concentric with the inner cylinder.

16. An engine crankcase ventilation system comprising:
 a crankcase ventilation line configured to pass a mixture of oil and blow-by gas from the engine crankcase to an oil separation chamber located above a cylinder head;
 the oil separation chamber having a bottom, a hole in the bottom, a tube protruding downwardly from the bottom at a location between two camshafts and having a first end mounted to the hole, the tube having a second end below the first end, the second end protruding downward below a top of the camshafts;
 a reservoir attached to the bottom and surrounding the second end of the tube; and
 an outlet in the reservoir above the second end providing fluidic access from the reservoir to the cylinder head.

17. The engine crankcase ventilation system of claim 16, wherein the outlet is positioned to allow oil to collect in the reservoir to a level deep enough to prevent gasses below a predetermined pressure from passing from the cylinder head to the oil separation chamber via the outlet and the tube.

18. The engine crankcase ventilation system of claim 16, wherein at least the bottom of the oil separation chamber and the tube are made as an integral piece, and the reservoir is made as a separate piece.

19. The engine crankcase ventilation system of claim 16, wherein the reservoir is made from a plastic material.

20. The engine crankcase ventilation system of claim 16, wherein the outlet is at least one slotted hole formed in the reservoir.

\* \* \* \* \*